United States Patent [19]

Kozuka et al.

[11] Patent Number: 5,098,973

[45] Date of Patent: Mar. 24, 1992

[54] HARDENING RESIN COMPOSITION

[75] Inventors: Soichiro Kozuka, Kobe; Tetsuya Kojimoto, Nagaokakyo; Minoru Yokoshima, Toride, all of Japan

[73] Assignees: Sumitomo Rubber Industries Ltd., Kobe; Nippon Kayaku Kabushiki Kaisha, Tokyo, both of Japan

[21] Appl. No.: 527,412

[22] Filed: May 23, 1990

[30] Foreign Application Priority Data

May 24, 1989 [JP] Japan ................................. 1-131213

[51] Int. Cl.$^5$ ................. C08F 20/10; C08F 20/40; C08L 63/02; C08L 63/10
[52] U.S. Cl. ................. 526/282; 525/523; 525/524; 525/531; 526/266; 526/273; 526/283; 526/284; 526/313
[58] Field of Search ............ 526/282, 273; 525/523, 525/524, 531

[56] References Cited

U.S. PATENT DOCUMENTS

| | | | |
|---|---|---|---|
| 2,454,743 | 11/1948 | Mowry | 526/282 |
| 3,143,535 | 8/1964 | Jackson | 526/282 |
| 4,394,494 | 7/1983 | Miyake | 526/273 |
| 4,556,701 | 12/1985 | Schindler | 526/282 |
| 4,719,268 | 1/1988 | Hefner | 526/273 |

OTHER PUBLICATIONS

Bosui Janaru, May 1988, pp. 70–105, published by Shinju-sha.

*Primary Examiner*—Joseph L. Schofer
*Assistant Examiner*—Fred Zitomer
*Attorney, Agent, or Firm*—Armstrong, Nikaido, Marmelstein, Kubovcik and Murray

[57] ABSTRACT

The invention relates to a hardening resin composition including a monomer represented by the formulas (1) or (2), a monomer represented by the formula (3), and epoxyacrylate or epoxymethacrylate. This composition is easily hardened at low temperature, weak in odor, small in shrinkage in hardening, excellent during durability against water and hot water, and thus suitable as the flooring material for a food processing factory, refrigerated warehouse, and cold storage.

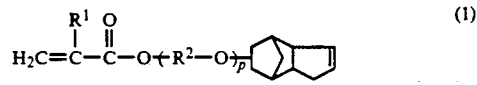

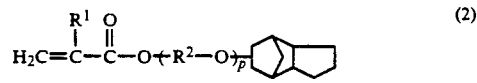

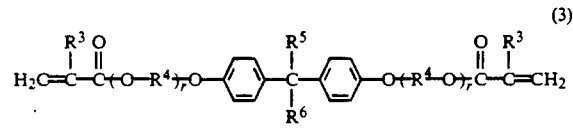

where $R^1$ to $R^6$, p and r are as defined.

7 Claims, No Drawings

HARDENING RESIN COMPOSITION

BACKGROUND OF THE INVENTION

The present invention relates to a hardening resin composition suitable for use as the flooring material for a food processing factory, refrigerated warehouse, cold storage and others, in particular.

The flooring material made of the conventional hardening resin composition of which shrinkage during hardening is large may be peeled from the base material or cracked. Therefore, such a resin composition is required to be small in shrinkage in hardening.

When a hardening resin composition having a strong odor is used as the flooring material for a food processing factory, refrigerated warehouse or cold storage, odor is transferred to the food, and the commercial value of the food is sacrificed. Also, the strong specific odor of the hardening resin may give discomfort to the workers applying the hardening resin on the floor or the workers in the food processing factory, and even poisoning symptoms may be experienced. Accordingly, the resin composition before hardening and the flooring material after hardening are both required to be weak in the specific odor of the resin composition.

In a food processing factory, especially, since water is used in large quantities, it is required that the flooring material after hardening possess excellent resistance to water.

Furthermore, in a food processing factory, since the floor is frequently disinfected with hot water, the flooring material after hardening is required to be excellent in durability against hot water.

On the other hand, when the hardening resin composition is used for repairing the flooring material in a refrigerated warehouse or cold storage used at low temperature, it is needed to repair without stopping the operation of the refrigerating machine. It is accordingly required that the hardening resin composition can be cured at low temperature.

The conventional hardening resin compsition for flooring material contains the following hardening resin as main component.

Epoxy resin*
Unsaturated polyester resin*
Methyl methacrylate*
Dicyclopentenyloxyethyl acrylate or dicyclopentenyloxyethyl methacrylate**
*: BOSUI JANARU, May 1988, pp. 36-115, published by Shinju-Sha
**: Japanese Patent Publication No. 43337/1986

However, since the epoxy resin takes a long time to cure, and is not hardened at below 0° C., it cannot be used in repairing of refrigerated warehouse or cold storage floors.

The unsaturated polyester resin has strong odor, and therefore must be avoided in odor-sensitive food processing factory, refrigerated warehouse or cold storage. Still more, the unsaturated polyester resin takes a long time to cure at low temperature, and the working efficiency is poor.

Methyl methacrylate has a strong odor before hardening, and is large in the shrinkage so that peeling from the base material or cracking may be caused.

Dicyclopentenyloxyethyl acrylate or dicyclopentenyloxyethyl methacrylate are hardened in a short time at low temperature and have little odor. However, the hardened matter obtained from such hardening resin is poor in durability against water or hot water.

SUMMARY OF THE INVENTION

A main object of the invention is to provide a hardening resin composition having little odor before and after hardening, curable in a short time at low temperature, small in shrinkage during hardening, and capable of obtaining a flooring material excellent in durability to water or hot water.

According to the invention, there is provided a hardening resin composition comprising at least one selected from acrylic monomer and methacrylic monomer represented by the following general formulas (1) and (2), which is contained in the range of 60 to 90% by weight of the whole monomer, at least one selected from bifunctional acrylic monomer and bifunctional methacrylic monomer represented by the following general formula (3), which is contained in the range of 5 to 20% by weight of the whole monomer, and at least one selected from epoxyacrylate and epoxymethacrylate, which is contained in the range of 5 to 20% by weight of the whole monomer.

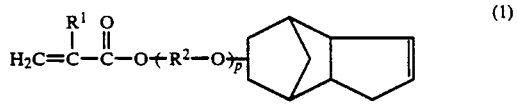

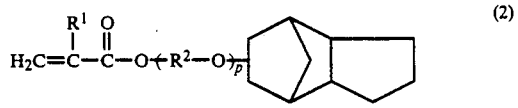

wherein $R^1$ is a hydrogen atom or a methyl group, $R^2$ is an ethylene group or a trimethylene group, and p is an integer of 0 to 5.

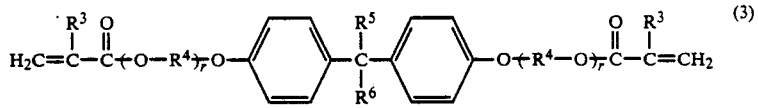

wherein $R^3$, $R^5$ and $R^6$ are same or different, a hydrogen atom or a methyl group, $R^4$ is an ethylene group or a trimethylene group and r is an integer of 1 to 10.

Such hardening resin compsition of the invention contains one or both of acrylic monomer and methacrylic monomer which are represented by the general formulas (1) and (2), and is hence easy to cure at low temperature and low in odor before and after hardening. Besides, the hardening resin composition contains at least one selected from bifunctional acrylic monomer and bifunctional methacrylic monomer represented by the general formula (3), producing a hardened matter excellent in durability against water and hot water, and therefore the flooring material after hardening is excellent in durability against water and hot water. Moreover, since the hardening resin composition contains at least one monomer of epoxyacrylate and epoxymethacrylate small in shrinkage during hardening, the shrinkage during hardening is small, so that peeling from a base material or cracking are avoided.

DETAILED DESCRIPTION OF THE INVENTION

The acrylic monomer or methacrylic monomer represented by the general formula (1) or (2) is quickly hardened at low temperature of about −40° C., and is low in odor before and after hardening. This monomer is liquid at room temperature to low temperature of about −40° C., and acts to lower the viscosity of the hardening resin composition. Besides, the monomer also acts to heighten the strength of the flooring material after hardening.

In the general formulas (1) and (2), a straight chain portion having an acryloyl group or a methacyloyl group is bonded with the cyclic compound represented by the following formula at 5- or 6-position of the cyclic compound. Either alone or mixture of acrylic or methacrylic monomers where the above bonding positions are 5- and 6-position, respectively may be used.

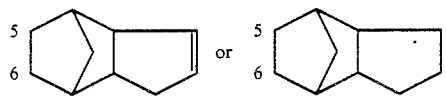

In the general formulas (1) and (2), it is more preferred that p is a integar of 1 or 2. The amount of the monomer of the general formula (1) or (2) in the whole monomer should be 60 to 90% by weight.

If the amount is less than 60% by weight, the viscosity of the hardening resin composition is high, it is difficult to apply on the base material, and the strength of the flooring material after hardening is insufficient.

On the other hand, if the amount of the monomer exceeds 90% by weight, the durability of the flooring material after hardening against water or hot water is inferior.

Examples of acrylic monomer or methacrylic monomer of the general formula (1) include the compounds represented by formulas (1a) to (1d).

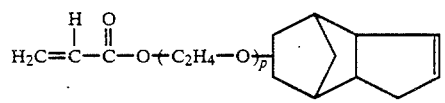 (1a)

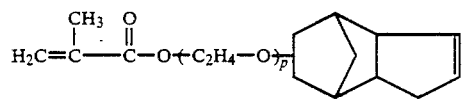 (1b)

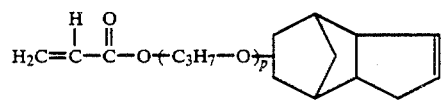 (1c)

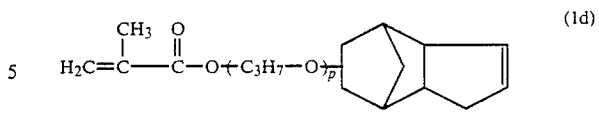 (1d)

wherein p is the same as defined above.

Examples of acrylic monomer or methacrylic monomer of the general formula (2) include the compounds represented by the formulas (2a) to (2d).

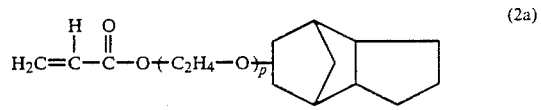 (2a)

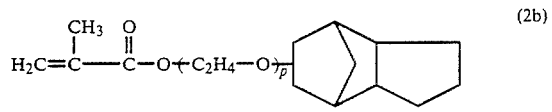 (2b)

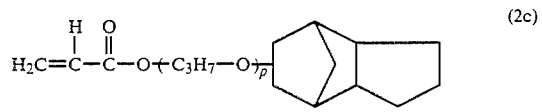 (2c)

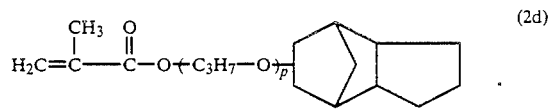 (2d)

wherein p is the same as defined above.

These monomers may be used either alone or in a mixture of plural types. As commercially available monomer represented by the general formula (1) or (2), there is exemplified "FA-512A" manufactured by Hitachi Kasei Co, Ltd.

The bifunctional acrylic monomer or bifuctional methacrylic monomer represented by the general formula (3) gives the durability against water and hot water to the flooring material after hardening. This monomer is liquid at room temperature to cold temperature of about −40° C.

It is preferred that r in the general formula (3) is an integer of 1 to 2.

The amount of the monomer of the general formula (3) in the whole monomer should be 5 to 20% by weight.

If the amount is less than 5% by weight, the durability of the flooring material after hardening to water and hot water is inferior. If the rate exceeds 20% by weight, the shrinkage of the hardening resin composition during hardening is large, and the flooring material after hardening may be peeled from the base material or cracked.

Examples of the bifunctional acrylic monomer or bifunctional acrylic monomer of the general formula (3) include the compounds represented by the following formulas (3a) to (3l).

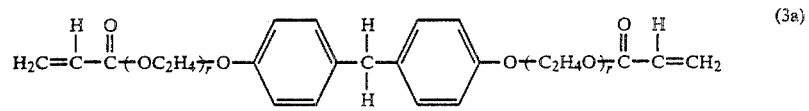 (3a)

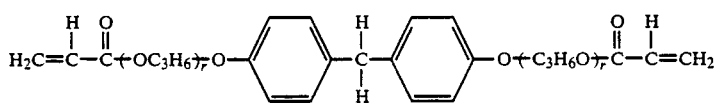

(3b)

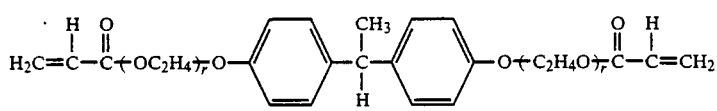

(3c)

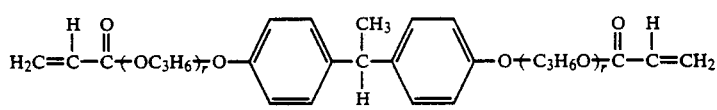

(3d)

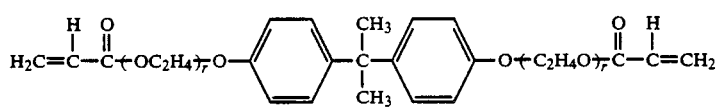

(3e)

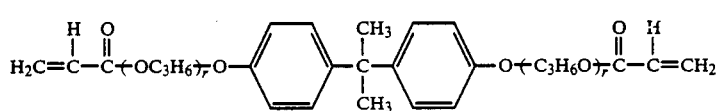

(3f)

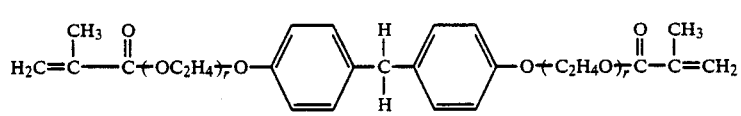

(3g)

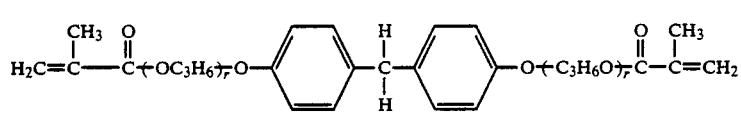

(3h)

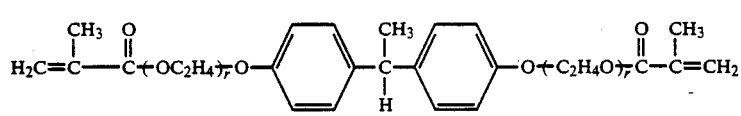

(3i)

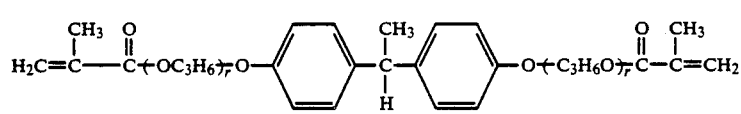

(3j)

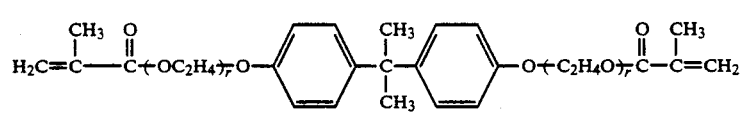

(3k)

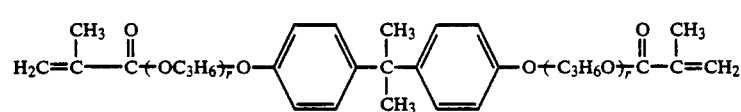

(3l)

wherein r is an integer of 1 to 10 as defined above.

These monomers may be used either alone or in a mixture of plural types.

Incidentally, epoxyacrylate or epoxymethacrylate refers to a compound where acrylic acid or methacrylic acid is added by esterification to the end of the epoxy resin skeleton. The epoxyacrylate or epoxyethacrylate acts to lower the shrinkage of the hardening resin composition during hardening.

The amount of the epoxyacrylate or epoxymethacrylate in the whole monomer should be 5 to 20% by weight.

If the amount is less than 5% by weight, the shrinkage of the hardening resin composition during hardening becomes large, and the flooring material after hardening may be peeled from the base material or cracked.

If the amount exceeds 20% by weight, the viscosity of the hardening resin composition becomes high, and it is difficult to apply on the base material, and the strength of the flooring material after hardening is insufficient.

Examples of epoxyacrylate or epoxymethacrylate may include acrylate of tris-phenolmethane epoxy resin, methacrylate of tris-phenolmethane epoxy resin, acrylate of phenolnovolak epoxy resin, methacrylate of phenolnovolak epoxy resin, acrylate or methacrylate of bifunctional bisphenol epoxy resin represented by the general formula (4) below. These acrylates or methacrylates may be used either alone or in a mixture of plural types.

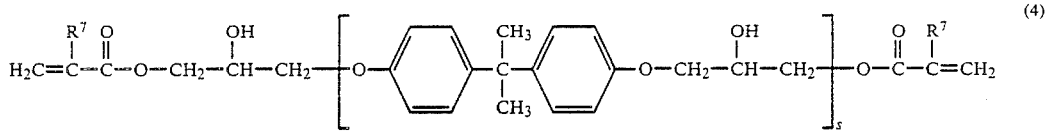

(4)

wherein $R^7$ is a hydrogen atom or a methyl group, and s is an integer of 1 to 10.

The hardening resin composition containing these monomers forms a three-dimensional reticular structure and hardens as a result of polymerization reaction of the portion of the acrylate group or methacrylate group contained in each monomer, owing to the action of hardening agent and hardening promoter.

As the hardening agent, organic peroxide is used. Examples of organic peroxide include tert-butyl hydroperoxide, cumene hydroperoxide, methylethyleketone hydroperoxide, methylisobutylketone hydroperoxide, diisopropylbenzene hydroperoxide, paramenthane hydroperoxide, 1,1,3,3-tetramethylbutyl hydroperoxide, 2,5-dimethylhexane-2,5-dihydroperoxide, and especially when curing is carried at −20° C. or less, benzoyl peroxide, tributyl perbenzoate, 2,2-bis-(tributyl peroxy)-butane, bis-(1-hydroxy-cyclohexyl)-butane, bis-(1-hydroxy-cyclohexyl)-peroxide, tributylperoxy-isopropyl carbonate or the like is preferably used.

As the hardening promoter, organic metal salt (including organic metal complex) and/or aromatic amine is used.

Organic metal salts include, for example, calcium salt, copper (II) salt, zinc (II) salt, manganese (II) salt, manganese (III) salt, lead (II) salt, cobalt (II) salt, iron (III) salt, vanadium (III) salt, zirconium (IV) salt or the like of organic acid. Organic acids include, for example, butanoic acid, pentanoic acid, hexanoic acid, naphthenic acid and higher fatty acids containing 8 to 30 carbon atoms that can be dissolved in the above monomers.

Examples of organic metal salts include cobalt octanoate, cobalt naphthenate, cobalt acetylacetonate, manganese octanoate, manganese naphthenate and manganese acetylacetonate.

Examples of aromatic amines may include aniline, N,N-dimethylaniline, N,N-diethylaniline, toluidine, N,N-dimethyl-p-toluidine, N,N-di(hydroxyethyl)toluidine, p-dimethylaminobenzaldehyde and the like.

The amounts of the hardening agent and hardening promoter to be added to the monomers are not particularly limited, and may be similar to the blending amounts of the hardening agent and hardening promoter in the conventional hardening resin composition.

For example, when organic metal salt or organic metal complex is used as the hardening promoter, it is preferred to add, to the monomer total of 100 parts by weight, 0.1 to 10 parts by weight of hardening agent, and 0.1 to 10 parts by weight of organic metal salt or organic metal complex as the hardening promoter.

When an aromatic amine is used as the hardening promoter, to the monomer total of 100 parts by weight, the hardening agent is preferably added by 0.1 to 10 parts by weight, and aromatic amine as hardening promoter by 0.01 to 10 parts by weight.

These monomers, hardening agents and hardening promoters should be stored separately before use for the sake of storage stability, and should be preferably mixed just before application on the base material. Also, only the hardening promoter may be mixed to the monomer beforehand, and the hardening agent may be added just before use. Furthermore, the monomer mixed with the hardening promoter and the monomer mixed with hardening agent may be blended together just before use.

The hardening resin composition may also contain a filler. As the filler, for example, aggregate, or other inorganic compound powder may be used.

As the aggregate, preferably, aggregate with the particle diameter of 1.15 mm or less may be used. As the aggregate, #4 to #7 silica sands (each particle diameter is respectively 1.680 to 0.297 mm, 1.190 to 0.149 mm, 0.590 to 0.074 mm and 0.250 mm or less) or ground ceramics (particle diameter of 0.1680 mm or less) may be used.

As other fillers except for aggregate, the powder of inorganic compound, such as powder of silicon oxide, heavy calcium carbonate, light calcium carbonate, kaolin or the like may be used. The particle diameter of such powder should be preferably 0.2 mm or less.

These aggregates or powders of inorganic compounds may be used either alone or in a mixture of plural types.

The blending rate of such filler to the monomer is not particularly limited, but it is desired to add the filler by 750 parts by weight or less to 100 part by weight of the whole monomer.

As described above, the hardening resin composition of the invention is easily hardened at low temperature and is low in odor before and after hardening. Further, this hardening resin composition shrinkage during hardening, and separation from base material or cracking is avoided, and the flooring material after hardening has excellent durability against water and hot water. Hence, the hardening resin composition may be preferably used as the flooring material for a food processing factory, refrigerated warehouse or cold storage.

EXAMPLES

The invention is described in further details below by referring to Examples and Comparative Examples.

EXAMPLES 1 TO 5 AND COMPARATIVE EXAMPLES 1 TO 6

Mixing the monomers shown in Table 1, hardening resin compositions were prepared.

In Table 1, the codes in the monomer column represent the following compounds.

DCPA:

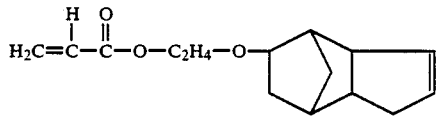

BPAA:

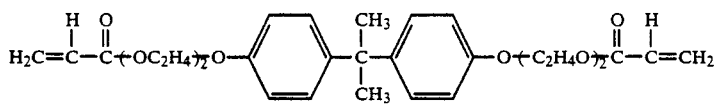

EA:

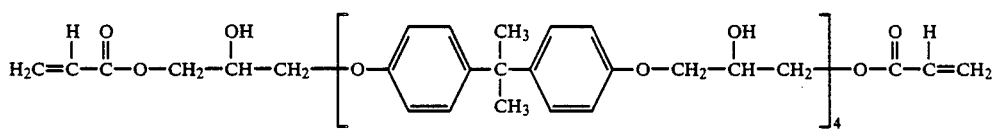

HPMA:

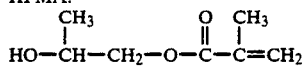

The hardening resin compositions of the Examples and Comparative Examples were tested as follows.

Viscosity Measurement

The viscosity (cps) of each hardening resin composition of Examples 1 to 5 and Comparative Examples 1 to 6 was measured by a cone plate type rotary viscometer in the conditions of 25° C. at rotating speed of 10 rpm.

Shrinkage Measurement

To 100 parts by weight of each hardening resin composition of Examples 1 to 5 and Comparative Examples 1 to 5 was added 1 part by weight of cumene hydroperoxide as hardening agent and 1 part by weight of cobalt naphthenate (cobalt content 6% by weight) as hardening promoter. The mixture obtained was poured into a mold with inner dimensions of 160 mm×10 mm×4 mm. After curing for one day at ordinary temperature, the hardened matter was measured in its longitudinal dimension, and a factor (%) of shrinkage was calculated.

Cold Hardening Test

To 100 parts by weight of each hardening resin composition of Examples 1 to 5 and Comparative Examples 1 to 5 were added 10 parts by weight of benzoyl peroxide as hardening agent, 10 parts by weight of N,N-dimethyl-p-toluidine as hardening promoter and 500 parts by weight of aggregate. Then, the mixture obtained was poured into a mold at −40° C. Curing for 24 hours at −40° C., a test piece with size of 25 mm×25 mm and thickness of 10 mm was prepared. This test piece was compressed at −40° C. at a rate of 1 mm/min. with a compressing member having a sectional area of 1 cm$^2$ by using a method similar to the compression strength measurement described below to measure a compressible strength (kg/cm$^2$).

When the compressible strength was 350 kg/cm$^2$ or more, the test piece was evaluated as "G"(good), and when the compressible strength was less than 350 kg/cm$^2$, the test piece was evaluated as "B"(bad).

Bending Breakage Strength Measurement

To 100 parts by weight of each hardening resin composition of Examples 1 to 5 and Comparative Examples 1 to 5 was added the following components. The mixture obtained was poured into a mold. After curing for 7 days at ordinary temperature, a rectangular parallelepiped test piece having a size of 130 mm×25 mm×10 mm was prepared. The test piece was bent according to ASTM D-790 in the condition of a span of 100 mm and a bending speed of 4 mm/min. to measure a bending breakage strength (kg/cm$^2$).

Hereinafter, "part" or "parts" means part by weight or parts by weight, respectively.

| | |
|---|---|
| Hardening agent: | |
| Cumene hydroperoxide | 1 part |
| Hardening promoter: | |
| Cobalt naphthenate (cobalt content 6% by weight) | 1 part |
| Filler: | |
| (1) #5 silica sand (particle diameter: 1.190 to 0.149 mm) | 200 parts |
| (2) #6 silica sand (particle diameter: 0.590 to 0.074 mm) | 200 parts |
| (3) Heavy calcium carbonate | 100 parts |
| Filler total | 500 parts |

Bending Breakage Strength Measurement After Immersion in Water

A test piece, which is the same as used in the above measurement of bending breakage strength except for curing for one day, was immersed in water at 20° C., and the bending breakage strength (kg/cm$^2$) was measured by the same method as mentioned above after lapse of 14 days and 28 days. The retaining rate of the bending breakage strength (%) was calculated in the following formula.

$$\text{Retaining rate}(\%) = \frac{\text{strength after immersion}}{\text{strength before immersion}} \times 100$$

Bending Breakage Strength Measurement After Immersion in Hot Water

A test piece, which is the same as used in the above measurement of bending breakage strength except for curing for one day, was immersed in hot water at 70° C., and the bending breakage strength (kg/cm$^2$) was measured by the same method as mentioned above after lapse of 14 days and 28 days. The retaining rate of the bending breakage strength (%) was measured in the following formula.

$$\text{Retaining rate}(\%) = \frac{\text{strength after immersion}}{\text{strength before immersion}} \times 100$$

Compression Breakage Strength Measurement

To 100 parts by weight of each hardening resin composition of Examples 1 to 5 and Comparative Examples 1 to 5 was added the above hardening agent, hardening promoter and fillers by the same manner as the above bending strength measurement. The mixture obtained was poured into a mold. After curing for one day at ordinary temperature, a test piece with a size of 10 mm×25 mm and a thickness of 10 mm was prepared. This test piece was compressed at a rate of 1 mm/min with a compressing member to measure a maximum load. Thus, the compression breakage strength (kg/cm$^2$) was calculated by dividing the maximum load by the compressing area.

Compression Breakage Strength Measurement After Immersion in Water

The same test piece as used in measurement of compression breakage strength was immersed in water at 20° C., and the compression breakage strength (kg/cm$^2$) was measured by the same method as mentioned above after the lapse of 14 days and 28 days, and the retaining rate of the compression breakage strength (%) was calculated in the following formula.

$$\text{Retaining rate}(\%) = \frac{\text{strength after immersion}}{\text{strength before immersion}} \times 100$$

COMPRESSION BREAKAGE STRENGTH MEASUREMENT AFTER IMMERSION IN HOT WATER

The same test piece as used in measurement of compression breakage strength was immersed in hot water at 70° C., and the compression breakage strength (kg/cm$^2$) was measured by the same method as mentioned above after the lapse of 14 days and 28 days, and the retaining rate of compression breakage strength (%) was calculated in the following formula.

$$\text{Retaining rate}(\%) = \frac{\text{strength after immersion}}{\text{strength before immersion}} \times 100$$

The test results are shown in the Table 1.

TABLE 1

| | Example No. | | | | | Comparative Example No. | | | | | |
|---|---|---|---|---|---|---|---|---|---|---|---|
| | 1 | 2 | 3 | 4 | 5 | 1 | 2 | 3 | 4 | 5 | 6 |
| Monomer | | | | | | | | | | | |
| DCPA (parts by weight) | 90 | 80 | 70 | 80 | 80 | 80 | 100 | 80 | 80 | 50 | 50 |
| BPAA (parts by weight) | 5 | 10 | 15 | 5 | 15 | — | — | 20 | — | 50 | — |
| E A (parts by weight) | 5 | 10 | 15 | 15 | 5 | — | — | — | 20 | — | 50 |
| HPMA (parts by weight) | — | — | — | — | — | 20 | — | — | — | — | — |
| Hardening agent (parts by weight) | 1 | 1 | 1 | 1 | 1 | 1 | 1 | 1 | 1 | 1 | 1 |
| Hardening promoter (parts by weight) | 1 | 1 | 1 | 1 | 1 | 1 | 1 | 1 | 1 | 1 | 1 |
| Filler (parts by weight) | 500 | 500 | 500 | 500 | 500 | 500 | 500 | 500 | 500 | 500 | 500 |
| Viscosity (cps)[*1] | 53 | 240 | 325 | 256 | 78 | 18 | 22 | 102 | 283 | 253 | 2000 |
| Shrinkage factor (%)[*2] | 0.5 | 0.3 | 0.2 | 0.2 | 0.6 | 0.2 | 0.8 | 1.2 | 0.2 | 2.2 | — |
| Cold hardening property | G | G | G | G | G | G | G | G | G | G | — |
| Bending strength | | | | | | | | | | | |
| Initial (kg/cm$^2$) | 367 | 326 | 297 | 313 | 333 | 310 | 391 | 342 | 305 | 213 | — |
| Immersion in water | | | | | | | | | | | |
| 14 days (kg/cm$^2$) | 235 | 229 | 223 | 188 | 242 | 96 | 160 | 260 | 149 | 182 | — |
| Retaining rate (%) | 64 | 70 | 75 | 60 | 73 | 31 | 41 | 56 | 49 | 85 | — |
| 28 days (kg/cm$^2$) | 205 | 192 | 187 | 172 | 212 | 47 | 137 | 223 | 131 | 152 | — |
| Retaining rate (%) | 56 | 59 | 63 | 55 | 64 | 15 | 35 | 65 | 43 | 71 | — |
| Bending strength | | | | | | | | | | | |
| Immersion in hot water | | | | | | | | | | | |
| 14 days (kg/cm$^2$) | 132 | 124 | 119 | 104 | 129 | 36 | 90 | 147 | 79 | 128 | — |
| Retaining rate (%) | 36 | 38 | 40 | 33 | 39 | 12 | 23 | 43 | 26 | 60 | — |
| 28 days (kg/cm$^2$) | 125 | 121 | 110 | 94 | 125 | 38 | 86 | 136 | 70 | 118 | — |
| Retaining rate (%) | 34 | 37 | 37 | 30 | 38 | 12 | 22 | 40 | 23 | 55 | — |
| Compression strength | | | | | | | | | | | |
| Initial (kg/cm$^2$) | 1361 | 1216 | 1105 | 1195 | 1258 | 1057 | 1435 | 1254 | 1099 | 1077 | — |
| Immersion in water | | | | | | | | | | | |
| 14 days (kg/cm$^2$) | 1020 | 1011 | 967 | 837 | 1082 | 455 | 760 | 1016 | 626 | 980 | — |
| Retaining rate (%) | 75 | 83 | 88 | 70 | 82 | 43 | 53 | 81 | 58 | 91 | — |
| 28 days (kg/cm$^2$) | 955 | 932 | 906 | 777 | 986 | 402 | 674 | 1105 | 560 | 911 | — |
| Retaining rate (%) | 70 | 77 | 82 | 65 | 79 | 38 | 47 | 80 | 51 | 85 | — |
| Immersion in hot water | | | | | | | | | | | |
| 14 days (kg/cm$^2$) | 762 | 757 | 751 | 633 | 830 | 233 | 455 | 865 | 473 | 869 | — |
| Retaining rate (%) | 56 | 62 | 68 | 53 | 66 | 22 | 32 | 69 | 43 | 81 | — |
| 28 days (kg/cm$^2$) | 735 | 749 | 740 | 611 | 825 | 254 | 459 | 828 | 451 | 859 | — |
| Retaining rate (%) | 54 | 62 | 67 | 51 | 66 | 24 | 32 | 66 | 41 | 80 | — |

[*1]Measured in the condition not containing the hardening agent, the hardening promoter and the filler.
[*2]Measured by using the hardening mixture not containing the filler.

EXAMPLES 6 TO 10 AND COMPARATIVE EXAMPLES 7 TO 12

In an analogous manner as Examples 1 to 5, the hardening resin compositions were respectively prepared by using the following monomers instead of DCPA, BPAA and EA.

DCPM:

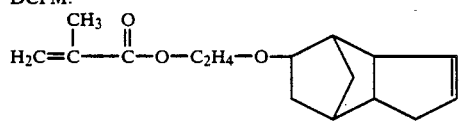

BPAM:

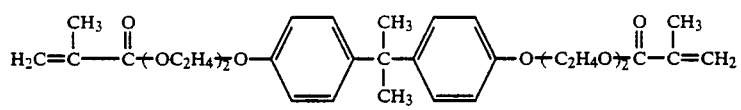

EM:

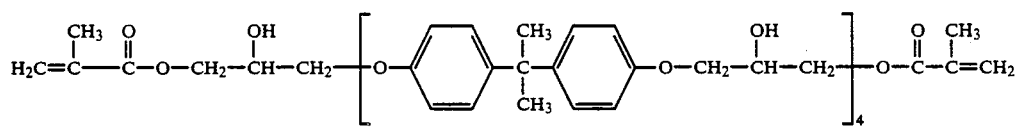

Test results which were obtained by the analogous test manner as Examples 1 to 5, are shown in Table 2.

TABLE 2

|  | Example No. | | | | | Comparative Example No. | | | | | |
|---|---|---|---|---|---|---|---|---|---|---|---|
|  | 6 | 7 | 8 | 9 | 10 | 7 | 8 | 9 | 10 | 11 | 12 |
| Monomer |  |  |  |  |  |  |  |  |  |  |  |
| DCPM (parts by weight) | 90 | 80 | 70 | 80 | 80 | 80 | 100 | 80 | 80 | 50 | 50 |
| BPAM (parts by weight) | 5 | 10 | 15 | 5 | 15 | — | — | 20 | — | 50 | — |
| E M (parts by weight) | 5 | 10 | 15 | 15 | 5 | — | — | — | 20 | — | 50 |
| HPMA (parts by weight) | — | — | — | — | — | 20 | — | — | — | — | — |
| Hardening agent (parts by weight) | 1 | 1 | 1 | 1 | 1 | 1 | 1 | 1 | 1 | 1 | 1 |
| Hardening promoter (parts by weight) | 1 | 1 | 1 | 1 | 1 | 1 | 1 | 1 | 1 | 1 | 1 |
| Filler (parts by weight) | 500 | 500 | 500 | 500 | 500 | 500 | 500 | 500 | 500 | 500 | 500 |
| Viscosity (cps)[*1] | 60 | 275 | 350 | 245 | 83 | 20 | 25 | 120 | 302 | 270 | 21000 |
| Shrinkage factor (%)[*2] | 0.5 | 0.2 | 0.2 | 0.1 | 0.7 | 0.3 | 0.8 | 1.4 | 0.4 | 2.2 | — |
| Cold hardening property | G | G | G | G | G | G | G | G | G | G | — |
| Bending strength |  |  |  |  |  |  |  |  |  |  |  |
| Initial (kg/cm$^2$) | 450 | 423 | 392 | 401 | 438 | 399 | 473 | 460 | 389 | 302 | — |
| Immersion in water |  |  |  |  |  |  |  |  |  |  |  |
| 14 days (kg/cm$^2$) | 279 | 306 | 292 | 238 | 316 | 101 | 175 | 255 | 181 | 250 | — |
| Retaining rate (%) | 62 | 72 | 75 | 59 | 72 | 26 | 37 | 55 | 47 | 83 | — |
| 28 days (kg/cm$^2$) | 272 | 254 | 255 | 228 | 272 | 80 | 176 | 244 | 170 | 227 | — |
| Retaining rate (%) | 60 | 60 | 65 | 57 | 62 | 20 | 37 | 53 | 44 | 75 | — |
| Bending strength |  |  |  |  |  |  |  |  |  |  |  |
| Immersion in hot water |  |  |  |  |  |  |  |  |  |  |  |
| 14 days (kg/cm$^2$) | 190 | 195 | 192 | 128 | 158 | 79 | 104 | 176 | 117 | 187 | — |
| Retaining rate (%) | 42 | 46 | 49 | 32 | 36 | 20 | 22 | 38 | 30 | 62 | — |
| 28 days (kg/cm$^2$) | 143 | 159 | 165 | 115 | 145 | 60 | 70 | 164 | 107 | 188 | — |
| Retaining rate (%) | 32 | 38 | 42 | 29 | 33 | 15 | 15 | 36 | 28 | 62 | — |
| Compression strength |  |  |  |  |  |  |  |  |  |  |  |
| Initial (kg/cm$^2$) | 1531 | 1429 | 1251 | 1345 | 1512 | 1165 | 1524 | 1466 | 1130 | 1199 | — |
| Immersion in water |  |  |  |  |  |  |  |  |  |  |  |
| 14 days (kg/cm$^2$) | 1147 | 1170 | 1088 | 915 | 1194 | 501 | 763 | 1174 | 610 | 1103 | — |
| Retaining rate (%) | 75 | 82 | 87 | 68 | 79 | 43 | 50 | 80 | 54 | 92 | — |
| 28 days (kg/cm$^2$) | 1040 | 1115 | 1026 | 876 | 1196 | 467 | 687 | 1100 | 554 | 1043 | — |
| Retaining rate (%) | 68 | 78 | 82 | 65 | 74 | 40 | 45 | 75 | 49 | 87 | — |
| Immersion in hot water |  |  |  |  |  |  |  |  |  |  |  |
| 14 days (kg/cm$^2$) | 1011 | 969 | 849 | 780 | 980 | 361 | 533 | 1099 | 453 | 984 | — |
| Retaining rate (%) | 66 | 68 | 68 | 58 | 65 | 31 | 35 | 75 | 40 | 82 | — |
| 28 days (kg/cm$^2$) | 813 | 826 | 765 | 740 | 905 | 350 | 503 | 968 | 451 | 923 | — |
| Retaining rate (%) | 53 | 58 | 61 | 55 | 60 | 30 | 33 | 66 | 40 | 77 | — |

[*1]Measured in the condition not containing the hardening agent, the hardening promoter and the filler.
[*2]Measured by using the hardening mixture not containing the filler.

EXAMPLES 11 TO 15 AND COMPARATIVE EXAMPLES 13 TO 18

In an analogous manner as Examples 1 to 5, the hardening resin compositions were prepared by using the following monomer, i.e. DCPTM together with BPAA and EA which were used in Examples 1 to 5.

DCPTM:

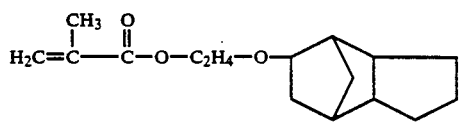

Test results, which were obtained by the analogous test manner as Examples 1 to 5, are shown in table 3.

TABLE 3

|  | Example No. | | | | | Comparative Example No. | | | | | |
|---|---|---|---|---|---|---|---|---|---|---|---|
|  | 11 | 12 | 13 | 14 | 15 | 13 | 14 | 15 | 16 | 17 | 18 |
| Monomer | | | | | | | | | | | |
| DCPTM (parts by weight) | 90 | 80 | 70 | 80 | 80 | 80 | 100 | 80 | 80 | 50 | 50 |
| BPAA (parts by weight) | 5 | 10 | 15 | 5 | 15 | — | — | 20 | — | 50 | — |
| E A (parts by weight) | 5 | 10 | 15 | 15 | 5 | — | — | — | 20 | — | 50 |
| HPMA (parts by weight) | — | — | — | — | — | 20 | — | — | — | — | — |
| Hardening agent (parts by weight) | 1 | 1 | 1 | 1 | 1 | 1 | 1 | 1 | 1 | 1 | 1 |
| Hardening promoter (parts by weight) | 1 | 1 | 1 | 1 | 1 | 1 | 1 | 1 | 1 | 1 | 1 |
| Filler (parts by weight) | 500 | 500 | 500 | 500 | 500 | 500 | 500 | 500 | 500 | 500 | 500 |
| Viscosity (cps)[*1] | 62 | 238 | 330 | 260 | 69 | 25 | 30 | 110 | 315 | 280 | 22500 |
| Shrinkage factor (%)[*2] | 0.7 | 0.4 | 0.3 | 0.2 | 0.9 | 0.5 | 0.7 | 1.5 | 0.3 | 2.5 | — |
| Cold hardening property | G | G | G | G | G | G | G | G | G | G | — |
| Bending strength | | | | | | | | | | | |
| Initial (kg/cm$^2$) | 421 | 378 | 335 | 381 | 402 | 354 | 426 | 405 | 333 | 256 | — |
| Immersion in water | | | | | | | | | | | |
| 14 days (kg/cm$^2$) | 243 | 275 | 258 | 229 | 280 | 106 | 158 | 219 | 157 | 205 | — |
| Retaining rate (%) | 58 | 73 | 77 | 60 | 70 | 30 | 37 | 54 | 47 | 80 | — |
| 28 days (kg/cm$^2$) | 232 | 223 | 214 | 186 | 253 | 92 | 132 | 198 | 137 | 182 | — |
| Retaining rate (%) | 55 | 59 | 64 | 49 | 63 | 26 | 31 | 49 | 41 | 71 | — |
| Immersion in hot water | | | | | | | | | | | |
| 14 days (kg/cm$^2$) | 193 | 200 | 185 | 164 | 238 | 78 | 115 | 186 | 117 | 161 | — |
| Retaining rate (%) | 46 | 53 | 55 | 43 | 59 | 22 | 27 | 46 | 35 | 63 | — |
| 28 days (kg/cm$^2$) | 164 | 189 | 171 | 144 | 213 | 46 | 94 | 166 | 100 | 156 | — |
| Retaining rate (%) | 39 | 50 | 51 | 38 | 53 | 13 | 22 | 41 | 30 | 61 | — |
| Compression strength | | | | | | | | | | | |
| Initial (kg/cm$^2$) | 1404 | 1355 | 1116 | 1283 | 1393 | 1158 | 1428 | 1331 | 1101 | 1155 | — |
| Immersion in water | | | | | | | | | | | |
| 14 days (kg/cm$^2$) | 997 | 1071 | 926 | 872 | 1115 | 498 | 657 | 1038 | 551 | 1028 | — |
| Retaining rate (%) | 71 | 79 | 83 | 68 | 80 | 43 | 46 | 78 | 50 | 89 | — |
| 28 days (kg/cm$^2$) | 927 | 1044 | 859 | 667 | 1086 | 440 | 585 | 945 | 451 | 820 | — |
| Retaining rate (%) | 66 | 77 | 77 | 52 | 78 | 38 | 41 | 71 | 41 | 71 | — |
| Immersion in hot water | | | | | | | | | | | |
| 14 days (kg/cm$^2$) | 815 | 922 | 771 | 616 | 933 | 370 | 514 | 878 | 407 | 785 | — |
| Retaining rate (%) | 58 | 68 | 69 | 48 | 67 | 32 | 36 | 66 | 37 | 68 | — |
| 28 days (kg/cm$^2$) | 716 | 827 | 692 | 565 | 878 | 324 | 486 | 785 | 363 | 739 | — |
| Retaining rate (%) | 51 | 61 | 62 | 44 | 63 | 28 | 34 | 59 | 33 | 64 | — |

[*1] Measured in the condition not containing the hardening agent, the hardening promoter and the filler.
[*2] Measured by using the hardening mixture not containing the filler.

EXAMPLES 16 TO 20 AND COMPARATIVE EXAMPLES 19 TO 24

In an analogous manner as Examples 1 to 5, the hardening resin compositions were prepared by using the following monomer, i.e. DCPTA together with BPAA and EA which were used in Examples 1 to 5.

DCPTA:

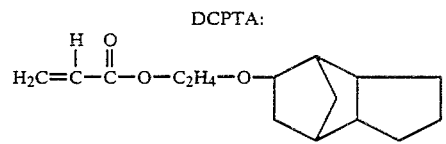

Test results, which were obtained by the analogous test manner as Examples 1 to 5, are shown in table 4.

TABLE 4

|  | Example No. | | | | | Comparative Example No. | | | | | |
|---|---|---|---|---|---|---|---|---|---|---|---|
|  | 16 | 17 | 18 | 19 | 20 | 19 | 20 | 21 | 22 | 23 | 24 |
| Monomer | | | | | | | | | | | |
| DCPTA (parts by weight) | 90 | 80 | 70 | 80 | 80 | 80 | 100 | 80 | 80 | 50 | 50 |
| BPAA (parts by weight) | 5 | 10 | 15 | 5 | 15 | — | — | 20 | — | 50 | — |
| E A (parts by weight) | 5 | 10 | 15 | 15 | 5 | — | — | — | 20 | — | 50 |
| HPMA (parts by weight) | — | — | — | — | — | 20 | — | — | — | — | — |
| Hardening agent (parts by weight) | 1 | 1 | 1 | 1 | 1 | 1 | 1 | 1 | 1 | 1 | 1 |
| Hardening promoter (parts by weight) | 1 | 1 | 1 | 1 | 1 | 1 | 1 | 1 | 1 | 1 | 1 |
| Filler (parts by weight) | 500 | 500 | 500 | 500 | 500 | 500 | 500 | 500 | 500 | 500 | 500 |
| Viscosity (cps)[*1] | 46 | 223 | 302 | 233 | 70 | 15 | 18 | 92 | 271 | 240 | 18500 |
| Shrinkage factor (%)[*2] | 0.6 | 0.2 | 0.2 | 0.1 | 0.8 | 0.1 | 0.6 | 1.0 | 0.2 | 2.0 | — |
| Cold hardening property | G | G | G | G | G | G | G | G | G | G | — |
| Bending strength | | | | | | | | | | | |
| Initial (kg/cm$^2$) | 359 | 328 | 311 | 322 | 346 | 319 | 400 | 355 | 289 | 205 | — |
| Immersion in water | | | | | | | | | | | |
| 14 days (kg/cm$^2$) | 233 | 239 | 239 | 196 | 256 | 93 | 163 | 185 | 136 | 166 | — |
| Retaining rate (%) | 65 | 73 | 77 | 61 | 74 | 29 | 41 | 52 | 47 | 81 | — |
| 28 days (kg/cm$^2$) | 184 | 226 | 221 | 184 | 211 | 41 | 145 | 153 | 113 | 141 | — |

TABLE 4-continued

| | Example No. | | | | | Comparative Example No. | | | | | |
|---|---|---|---|---|---|---|---|---|---|---|---|
| | 16 | 17 | 18 | 19 | 20 | 19 | 20 | 21 | 22 | 23 | 24 |
| Retaining rate (%) | 51 | 69 | 71 | 57 | 61 | 13 | 36 | 43 | 39 | 69 | — |
| Immersion in hot water | | | | | | | | | | | |
| 14 days (kg/cm$^2$) | 158 | 174 | 205 | 155 | 187 | 48 | 124 | 135 | 98 | 139 | — |
| Retaining rate (%) | 44 | 53 | 66 | 48 | 54 | 15 | 31 | 38 | 34 | 68 | — |
| 28 days (kg/cm$^2$) | 151 | 157 | 190 | 148 | 170 | 32 | 111 | 110 | 81 | 107 | — |
| Retaining rate (%) | 42 | 48 | 61 | 46 | 49 | 10 | 28 | 31 | 28 | 52 | — |
| Compression strength | | | | | | | | | | | |
| Initial (kg/cm$^2$) | 1321 | 1221 | 1189 | 1251 | 1289 | 1211 | 1451 | 1341 | 1120 | 1090 | — |
| Immersion in water | | | | | | | | | | | |
| 14 days (kg/cm$^2$) | 1017 | 1074 | 1082 | 926 | 1096 | 618 | 813 | 1086 | 650 | 1003 | — |
| Retaining rate (%) | 77 | 88 | 91 | 74 | 85 | 51 | 56 | 81 | 58 | 92 | — |
| 28 days (kg/cm$^2$) | 964 | 977 | 1034 | 863 | 1018 | 557 | 682 | 1046 | 594 | 948 | — |
| Retaining rate (%) | 73 | 80 | 87 | 69 | 79 | 46 | 47 | 78 | 53 | 87 | — |
| Immersion in hot water | | | | | | | | | | | |
| 14 days (kg/cm$^2$) | 805 | 806 | 856 | 688 | 825 | 339 | 595 | 966 | 504 | 850 | — |
| Retaining rate (%) | 61 | 66 | 72 | 55 | 64 | 28 | 41 | 72 | 45 | 78 | — |
| 28 days (kg/cm$^2$) | 687 | 658 | 748 | 588 | 696 | 279 | 479 | 872 | 414 | 752 | — |
| Retaining rate (%) | 52 | 54 | 63 | 47 | 54 | 23 | 33 | 65 | 37 | 69 | — |

*[1]Measured in the condition not containing the hardening agent, the hardening promoter and the filler.
*[2]Measured by using the hardening mixture not containing the filler.

As shown in Tables 1 to 4, all of Examples 1 to 20 containing BPAA and BPAM as bifunctional acrylic monomer or bifunctional methacrylic monomer represented by the general formula (3) were higher in the retaining rates of bending strength and compression strength after immersion in water and in hot water than Comparative Examples 1, 2, 4, 7, 8, 10, 13, 14, 16, 19, 20 and 22 not containing BPAA or BPAM. Also, as shown in Examples 2, 4, 5, 7, 9, 10, 12, 14, 15, 17, 19 and 20 when the content of the BPAA or BPAM were higher, the retaining rates of bending strength and compression strength after immersion in water and in hot water were raised. It was hence recognized that BPAA or BPAM contributes to durability against water and hot water after hardening of the hardening resin composition.

Moreover, as shown in Examples 1 to 20 in Tables 1 to 4, when the content of DCPA, DCPM, DCPTM and DCPTA contained as acrylic monomer or methacrylic monomer represented by the formulas (1) or (2) were higher, the viscosity was dropped. The cold hardening property at low temperature was superior by adding DCPA, DCPM, DCPTM and DCPTA.

Besides, as shown in Comparative Examples 6, 12, 18 and 24, when the content of EA as epoxyacrylate or EM as epoxymethacrylate were as high as 50% by weight of the total monomer, as compared with Examples 1 to 20 and Comparative Examples 4, 10, 16 and 22 with EA or EM content of 20% by weight or less of the total monomer, the viscosity was extremely high, and it could not be applied on the base material. It was accordingly known that the rate of epoxyacrylate in the total monomer should be kept under 20% by weight.

Meanwhile, Comparative Examples 1, 7, 13 and 19 are a hardening resin composition disclosed in the Japanese Patent Publication No. 43337/1986, and HPMA was blended in order to impart the flexibility and toughness to the flooring material. In Comparative Examples 1, 7, 13 and 19, however, the retaining rates of bending strength and compression strength after immersion in water and in hot water were lower than those of Examples 1 to 20.

What is claimed is:

1. A hardening resin composition consisting essentially of
   at least one monomer selected from an acrylic monomer and a methacrylic monomer represented by formulas (1) and (2), which is in the range of 60 to 90% by weight of the total monomer content,
   at least one monomer selected from bifunctional acrylic monomer and bifunctional methacrylic monomer represented by formula (3), which is in the range of 5 to 20% by weight of the total monomer content, and
   at least one monomer selected from epoxyacrylate and epoxymethacrylate, which is in the range of 5 to 20% by weight of the total monomer content,

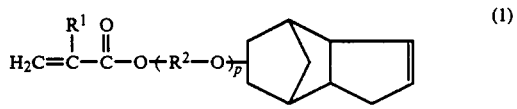

(1)

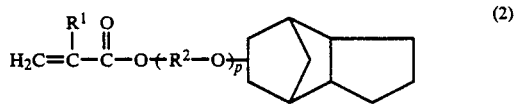

(2)

wherein R$^1$ is hydrogen or methyl, R$^2$ is ethylene or trimethylene, and p is an integer of 0 to 5;

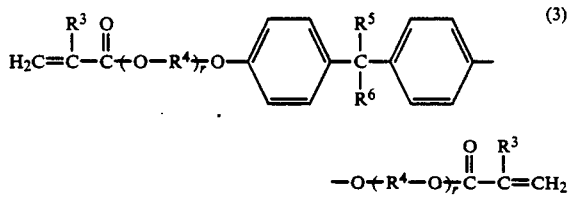

(3)

wherein R$^3$, R$^5$ and R$^6$ are the same or different and are hydrogen or methyl, R$^4$ is ethylene or trimethylene, and r is an integer of 1 to 10.

2. A hardening resin composition as set forth in claim 1, wherein said epoxyacrylate is at least one selected from the group consisting of acrylate of tris-phenolmethane epoxy resin, acrylate of phenolnovolak epoxy resin, and acrylate of bifunctional bisphenol epoxy resin, and said epoxymethacrylate is at least one selected from the group consisting of methacrylate of tris-phenolmethane epoxy resin, methacrylate of phenolnovolak epoxy resin, and methacrylate of bifunctional bisphenol epoxy resin.

3. A hardening resin composition as set forth in claim 2, wherein the acrylate or methacrylate of said bisphenol epoxy resin is represented by formula (4):

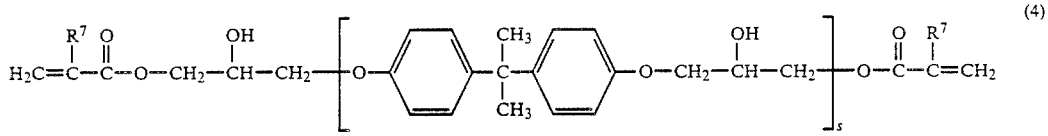

wherein $R^7$ is hydrogen or methyl, and s is an integer of 1 to 10.

4. A hardening resin composition as set forth in claim 1, further comprising an organic peroxide as a hardening agent.

5. A hardening resin composition as set forth in claim 1, wherein organic metal salt, is contained as a hardening promoter.

6. The hardening resin composition of claim 5 wherein said organic metal salt is at least one member selected from the group consisting of organic metal complexes and aromatic amines.

7. A hardening resin composition as set forth in claim 1, further comprising a filler included.

* * * * *